T. H. & H. JAMES.
Horse Hay Fork.
No. 41,072.
Patented Jan. 5, 1864.
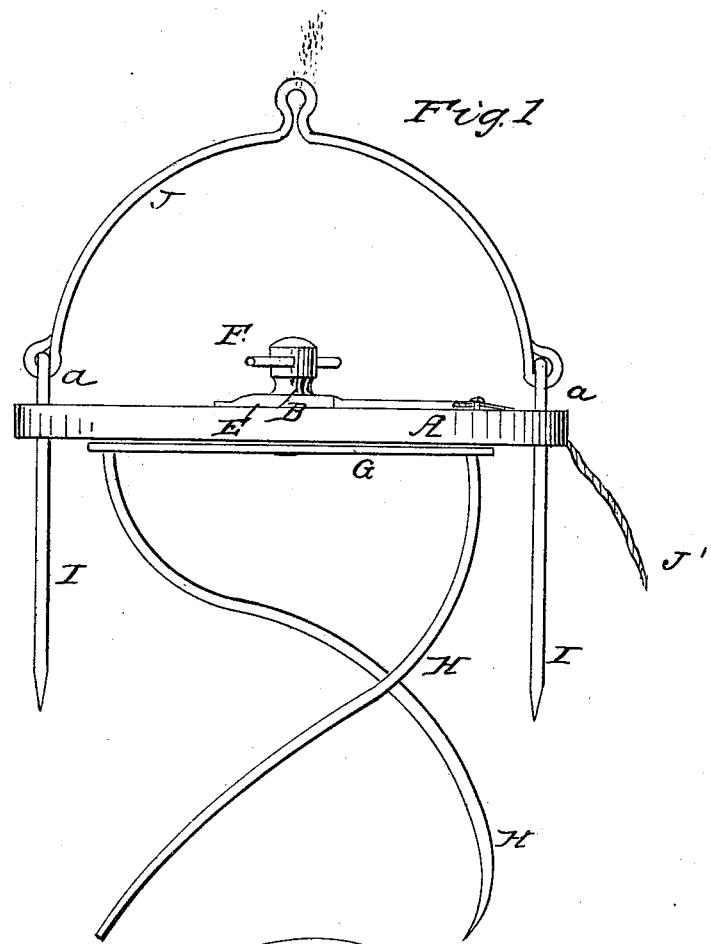
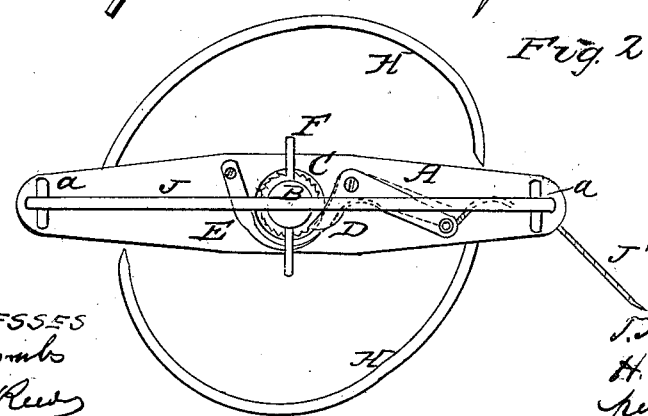
WITNESSES
Jn Coombs
Geo W Reed
INVENTORS
T. H. James
H. James
per Munn & Co
Attorneys
41,072

UNITED STATES PATENT OFFICE.

T. H. JAMES AND H. JAMES, OF STOCKPORT, NEW YORK.

IMPROVEMENT IN HORSE HAY-FORKS.

Specification forming part of Letters Patent No. 41,072, dated January 5, 1864.

*To all whom it may concern:*

Be it known that we, T. H. JAMES and H. JAMES, of Stockport, in the county of Columbia and State of New York, have invented a new and Improved Horse Hay-Fork; and we do hereby declare that the following is a full, clear, and exact description of the same, reference being had to the accompanying drawings, making a part of this specification, in which—

Figure 1 is a side view of our invention; Fig. 2, a plan or top view of the same.

Similar letters of reference indicate corresponding parts in the two figures.

This invention relates to a new and improved horse hay-fork, such as are used for elevating hay in barns.

To enable those skilled in the art to fully understand and construct our invention, we will proceed to describe it.

A represents what may be termed the "head" of the hay-fork. This head may be constructed of wood. That will probably be the material used. In the head A, at its center, there is fitted an arbor, B, having upon it, above the head, a ratchet, C, into which a pawl, D, catches, the pawl being attached to the head and having a spring, E, bearing against it, which keeps it engaged with the ratchet, as shown in Fig. 2. The arbor has a rod, F, passing through it near its upper end, which serves as a handle for turning it; and the lower end of the arbor is attached to a bar, G, which is at the under side of the head A, and may be either of iron or wood.

To each end of the bar G there is attached a spiral or screw tine, H, of any suitable length. These tines may be of iron or steel, the latter material being preferable.

In each end of the head A there is fitted a straight tine or rod, I. These tines are at right angles with the head A, and extend down from it a distance equal to about one-half the length of the tines. The upper ends of the tines or rods are bent to form eyes *a a*, into which the ends of a bail, J, are secured.

The operation is as follows: The hoisting-rope is attached to the bail J and passes around a pulley in the upper part of the barn, above where the hay is to be elevated and deposited, and extends down and under a pulley secured to the flooring of the barn, and has the draft-animal attached to its end. The fork is lowered by backing the horse; and when on the hay to be elevated the tines H are screwed into the latter by the attendant on the hay, who turns the arbor B for that purpose. The head A is prevented from turning with the arbor B by the straight tines or rods I I, which also pass down into the hay. When the tines H are screwed into the hay sufficiently far the horse is started and the fork is elevated, the tines H holding their load, the straight tines or rods I preventing the head A from turning and tines H from turning or unscrewing out of the hay, while the ratchet and pawl C D prevent the tines H from turning independently of the head A. When the loaded fork is elevated to the desired spot the attendant pulls a cord or rope, J', which is attached to the pawl D, and thereby liberates the arbor B, which at once turns under the gravity of the load on the tines H, and the load is discharged in consequence from said tines.

The device is extremely simple and efficient, may be constructed at a small cost, and manipulated with the greatest facility.

We are aware that a single spiral tine has before been employed, arranged in the center of a lifting-bar. We therefore disclaim the invention of the spiral tine.

In our improvement we have a screw-tine at each end of the lifting-bar, which permits the lifting of nearly three times as much hay at one operation as can be raised with a single central tine, because the mass of hay between the tines may be greater than the load which the tines could separately carry.

Having thus described our invention, what we claim as new, and desire to secure by Letters Patent, is—

1. The lifting-bar G, provided with a spiral tine, H, at each end, combined with the head A, in the manner herein shown and described.

2. The steady tines or rods F, attached to the head A, when used in combination with the spiral or screw tines H, for the purpose specified.

THOMAS H. JAMES.
HENRY JAMES.

Witnesses:
THOS. S. J. DOUGLAS,
GEO. W. REED.